May 24, 1938.  E. J. FLYNN ET AL  2,118,642
FURNACE TEMPERATURE INDICATOR
Filed Dec. 21, 1935  2 Sheets-Sheet 1
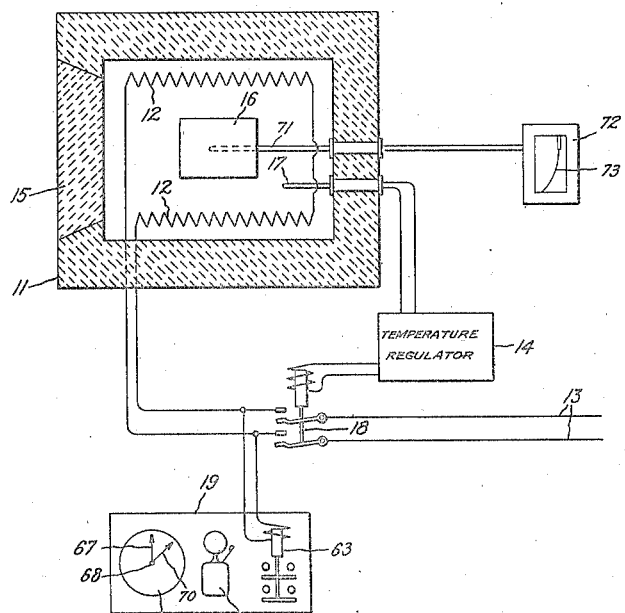
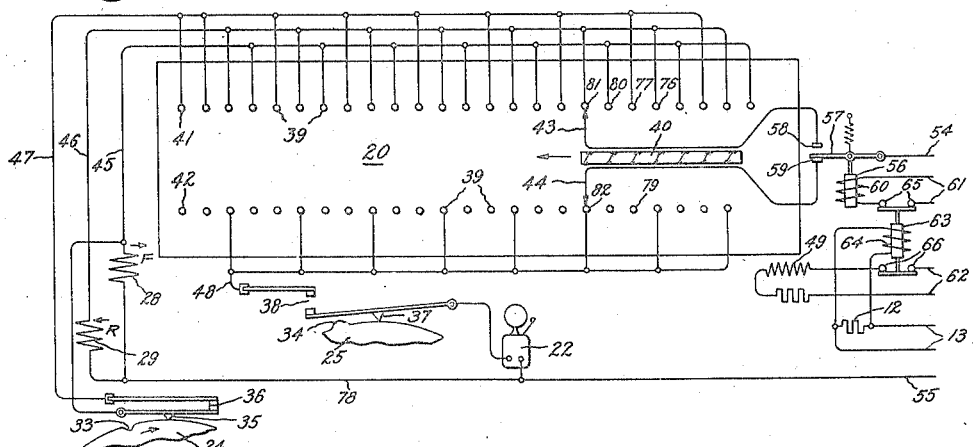
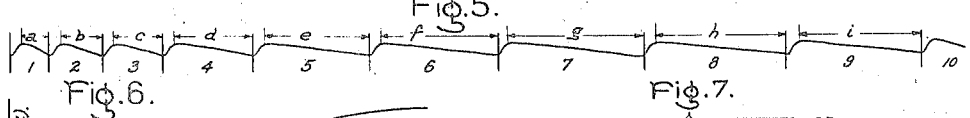
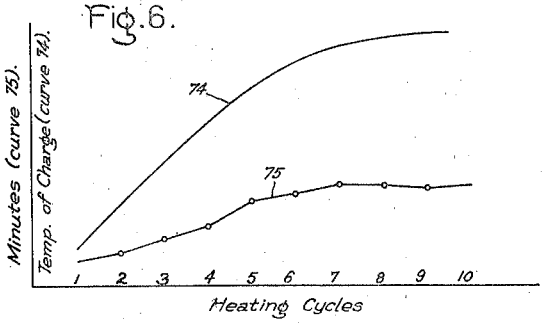
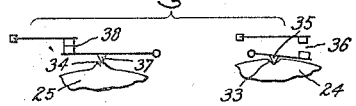
Inventors:
Edward J. Flynn,
Jose T. Mireles Malpica,
by Harry E. Dunham
Their Attorney.

May 24, 1938.  E. J. FLYNN ET AL  2,118,642
FURNACE TEMPERATURE INDICATOR
Filed Dec. 21, 1935   2 Sheets-Sheet 2

Inventors:
Edward J. Flynn,
Jose T. Mireles Malpica,
by Harry E. Dunham
Their Attorney.

Patented May 24, 1938

2,118,642

UNITED STATES PATENT OFFICE 2,118,642

FURNACE TEMPERATURE INDICATOR

Edward J. Flynn and Jose T. Mireles Malpica, Schenectady, N. Y., assignors to General Electric Company, a corporation of New York Application December 21, 1935, Serial No. 55,659

9 Claims. (Cl. 236—15)

Our invention relates to furnaces and apparatus for heating material to a uniform temperature and concerns particularly methods and apparatus for determining when a furnace charge has attained a uniform temperature throughout.

It is an object of our invention to overcome the loss of time, diminution in output of heating furnaces, and loss of energy incident to heating furnace charges for unnecessarily long periods to insure completion of the heating.

Other and further objects and advantages will become apparent as the description proceeds.

Our invention is primarily applicable to furnaces having heating sources and temperature regulators for turning the heating sources on and off alternately to keep the temperature of the furnace within predetermined limits. Once the furnace has reached the temperature at which the regulator is set to turn off the heat, the furnace will alternately cool and become hotter as the regulator turns the heat off and on to keep the temperature within the limits set.

In carrying out our invention in its preferred form, we employ such a furnace and determine when successive complete heating cycles or successive cooling periods are equal in time duration. The cooling periods become successively longer as the charge approaches the temperature of the furnace and becomes uniformly heated throughout its mass. When the successive cooling periods have become equal in length, we know that the heating of the charge is completed.

To compare the time durations of successive cooling periods, we provide a reversible timer which runs in opposite directions during successive cooling periods, and thereafter resets to a zero position in case two successive periods are unequal in length, but rings an alarm in case the timer returns to zero without needing to be reset, thus showing that successive cooling periods have become equal in length.

Figure 3:
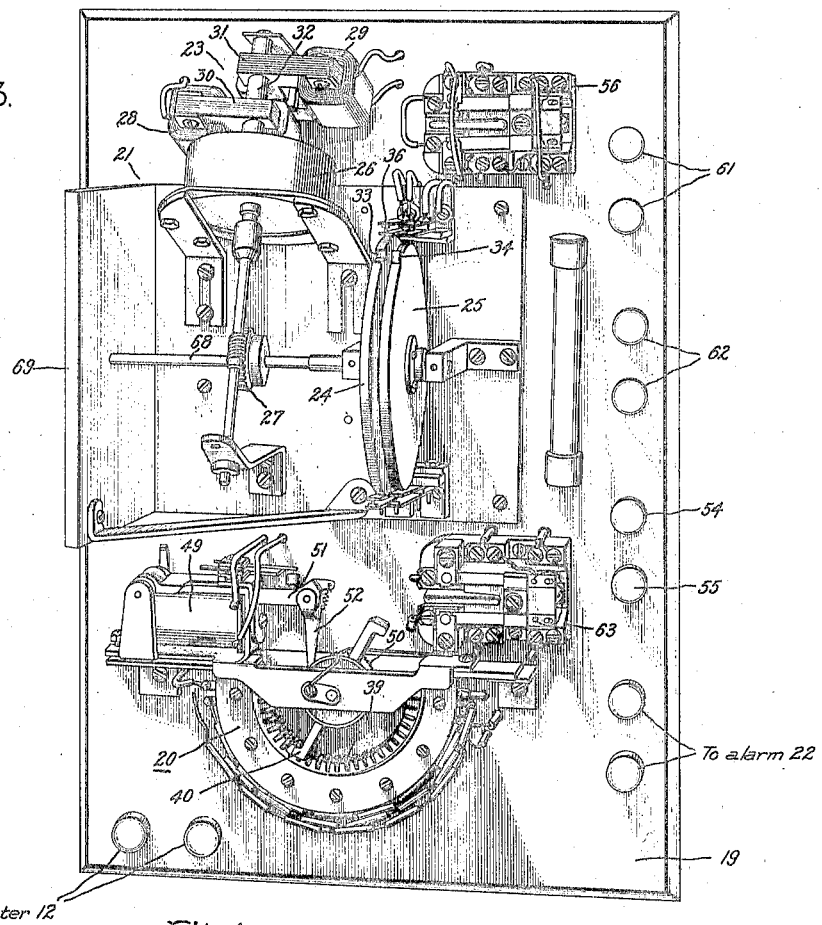
Figure 4:
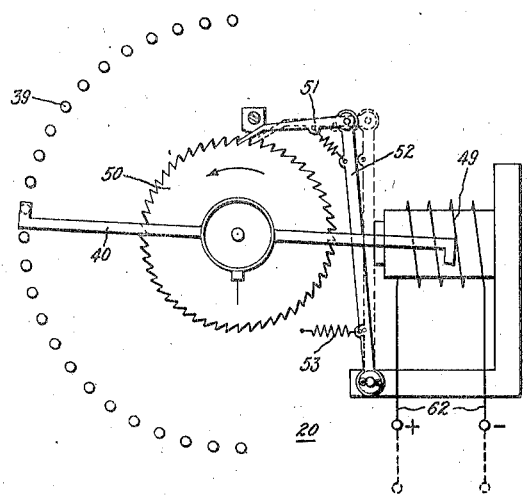

The invention will be understood more readily from the following detailed description when considered in connection with the accompanying drawings, and those features of the invention which are believed to be novel and patentable will be pointed out in the claims appended hereto. In the drawings, Fig. 1 is a schematic diagram of apparatus illustrating one manner of carrying out our invention; Fig. 2 is a circuit diagram of time-comparing apparatus used in the apparatus of Fig. 1; Fig. 3 is a perspective view of the apparatus of Fig. 2; Fig. 4 is a schematic diagram of a step-by-step switch forming a part of the apparatus of Fig. 3; Figs. 5 and 6 are graphs explanatory of the principle of operation of our apparatus; and Fig. 7 is a fragmentary view showing, in a different position, cam operated switch means forming a part of the apparatus of Fig. 2. Like reference characters are used in the drawings to designate like parts throughout.

Our invention will be explained in connection with an electric furnace having heating resistance elements supplied by a source of current 13 controlled by an electric temperature regulator 14 of any suitable design for turning the heating elements 12 on and off. It will be understood, however, that our invention is not restricted to the precise type of furnace disclosed and obviously includes the use of gas or oil-fired furnaces with on and off temperature regulators for all or part of the heating elements, or electric furnaces in which the charge, itself, serves as the resistor, or high-frequency induction furnaces.

The furnace 11 is provided with a door 15 which may be opened to admit a charge 16 which is to be heated. There is, in the furnace 11, a temperature-responsive element 17 of the thermocouple, resistance or other suitable type which forms a part of the temperature regulator 14. A double-pole switch 18 operated by the regulator 14 serves to turn on the heating source 12 when the temperature in the furnace 11 falls to a lower limit and to turn off the heater 12 when the temperature rises to an upper limit. In an ideal regulator, these limits might coincide but, in a practical apparatus, there must be a slight temperature range between the limits at which the regulator operates. A time-comparing device 19 is connected across the heater 12 so that operations of the temperature regulator 14 cause the device 19 to operate on the same cycle as the heater 12.

The time-comparing device 19 comprises a step-by-step switch 20 (Fig. 3), a reversible timer 21 (Fig. 3), and an alarm 22 (Figs. 1 and 2). The timer 21 comprises a reversible constant-speed motor 23 driving a pair of disc cams 24 and 25 through a speed reduction unit 26 and worm gearing 27. The motor 23 has separate field windings 28 and 29 for producing forward and reverse rotation, respectively. In the arrangement shown, the motor 23 also has its field cores 30 and 31 separate for the two directions of rotation and has a rotor (concealed by the shell 32) with portions cooperating with both field cores rotated by the rotating magnetic field of whichever field winding 28 or 29 is energized. The motor 23 may be of the self-starting synchronous type described more in detail in United States Patent No. 1,495,936, Warren, and the arrangement for obtaining reversal in rotation may be such as described more in detail in United States Patent No. 1,944,083, Holland, in connection with the reversing motor combination illustrated in Fig. 2 of the latter patent. For the sake of convenience, rotation of the motor 23 will be referred to in the specification as forward rotation when produced by the winding 28 and as reversed rotation when produced by the winding 29.

The disc cam 24 has a notch 33 cut into its periphery and the cam 25 has a projection 34. The notch 33 cooperates with cam follower 35 (Fig. 2) operating normally closed contacts 36, and the projection 34 cooperates with a cam follower 37 operating normally open contacts 38. The arrangement is such that the notch 33 and the projection 34 engage the respective cam followers 35 and 37 at the same angular position, referred to for convenience as the zero position, of the cams 24 and 25 and the timing motor 23. We have shown a pair of mechanically connected disk cams with a notch in one and a projection on the other but it will be understood that our invention is not limited to this precise arrangement and obviously includes the use of a single cam with suitable radial or axial formations thereon to operate contacts spaced suitably to act at the same time.

The step-by-step switch 20 may be of any suitable type having a plurality of contacts which may be closed in rotation, i. e., the contacts are closed successively and then the sequence of successive closings is repeated in the same order indefinitely. Sufficient contacts are preferably provided for closing four different circuits in succession and, for this purpose, we provide at least one moving contact and at least four stationary contacts. In order to accelerate the operation of the apparatus, the stationary contacts may be separated into two banks with three contacts in one bank and only one corresponding contact in the other bank. Two separate movable contacts may be provided, cooperating with the two banks of stationary contacts. However, for the sake of obtaining smooth operation and to permit the use of standard equipment, we employ a standard form of step-by-step switch, such as shown at 20, having a large number of stationary contacts 39 in each bank arranged in a semicircle, and a rotor 40 with double-ended movable contacts cooperating with each bank. The banks of contacts 39 are shown laid out in a straight line in Fig. 2 in which the numerals 41 and 42 are used to represent collectively the stationary contacts of the two respective banks. The movable contacts, a timer contact and an alarm contact, respectively, cooperating with the banks 41 and 42 are shown at 43 and 44. Every third stationary contact is connected together to cause the contacting sequence to be repeated after every third contact. The contacts 41 are divided into three groups, forward contacts, reversing contacts, and reset contacts, connected respectively to conductors 45, 46, and 47, each contact of one group being adjacent on either side to contacts of the other two groups. Only one group of contacts, stationary alarm contacts, is used in the bank 42, and these are connected to a conductor 48. The switch 20 is provided with an actuating winding 49 which is energized whenever the heater 12 is energized.

As shown in Fig. 4, the step-by-step rotation of the movable contacts 43 and 44 on the rotor 40 of the switch 20 is produced by a ratchet mechanism consisting of a ratchet 50 on the rotor 40 and a pawl 51 carried by an armature 52 attracted by the winding 49 and biased away from the winding 49 by a spring 53. The ratchet wheel 50 has its teeth so arranged that the movable contacts 43 and 44 are advanced one step, from one stationary contact to the next, by the spring 53 whenever the winding 49 is deenergized.

An alternating-current source of suitable voltage for operating the motor 23 and the alarm 22 is connected at terminals 54 and 55. For controlling the energization of the movable contacts 43 and 44, a double-throw relay 56 is provided which is also energized when the heater 12 is energized. The relay 56 has an operating winding 60, a movable contact 57 connected to the current supply terminal 54 and spring biased to an upward position, and stationary contacts 58 and 59 connected to the contacts 43 and 44, respectively, of the step-by-step switch 20.

Although the same current source may, if desired, be used for all purposes in the apparatus, we find it more convenient to use more than one current source in order that standard elements may be used in assembling the apparatus and each element may be operated by the type of current best suited to it. A source of alternating current 61 is provided for energizing the relay winding 60 and a source of direct current 62 is provided for energizing the winding 49 of the step-by-step switch 20. To control the current sources 61 and 62, a relay 63 is provided having an energizing winding 64 in parallel with the furnace heater 12, normally open contacts 65 in the circuit of the winding 60, and normally open contacts 66 in the circuit of the winding 49.

For the purpose of controlling the alarm 22, it is connected between the current source terminal 55 and the stationary alarm contacts 42 of the step-by-step switch 20 through the lead 48 and the normally open contacts 38. The windings 28 and 29 of the motor 23 are each connected on one side to the current source terminal 55. The other side of the forward winding 28 is connected through the lead 45 to the forward contacts in the bank 41 of the step-by-step switch 20, and the other side of the reversing winding 29 is connected through the lead 46 to the reversing contacts in the bank 41 of the switch 20. The leads 45 and 47 are connected through the normally closed contact 36 so that the forward winding 28 is normally connected through the lead 47 also to the reset contacts of the bank 41 of the switch 20.

Instead of depending on the alarm 22 to give an audible signal or indication when the lengths of successive time periods are equal, we may provide a visual indication in the form of a pointer 67 fixed on the shaft 68 of the timer 21 on the outside face of the wall 69, and a pointer 70 frictionally mounted on the wall 69 with the same pivot axis as the pointer 67, so that the pointer 70 may be set at the position where the pointer 67 last stopped in order to determine whether the pointer 67 stops again at the same position.

The principle of operation of our invention will be understood better by first considering the nature of the heating cycles of an on-and-off regulated furnace. Initially, of course, after the door 15 has been opened and a cold charge 16 has been placed in the furnace 11, the temperature of the furnace will be relatively lower and the temperature will rise until the upper limit of the temperature regulator setting is reached. Thereupon, the regulator 14 will turn off the heat and the furnace will fall in temperature until the lower limit of the temperature regulator setting is reached when the heat will again be turned on. Such heating cycles will then be repeated indefinitely, as shown in the curve of Fig. 5 in which temperature measured by the element 11 is plotted as an ordinate against time as the abscissa. Each heating cycle consists of a portion in which the temperature rises followed by a portion in which the temperature falls. The successive complete heating cycles are represented by the numerals 1 to 10 and the cooling periods are represented by the letters a, b, c, etc.

In order to demonstrate the principle of the invention by showing how the charge 16 comes up to temperature, we have provided a temperature-responsive element 71 placed in the center of the charge 16 and a recorder 72 producing a record curve 73, showing how the temperature of the charge rises. It will be understood, however, that the elements 71 and 72 are not needed for carrying out our invention and are shown merely to explain how the demonstration curve 73 was obtained. In fact, in ordinary commercial work, it would be difficult to determine the actual temperature of the charge 16, particularly the interior thereof, and the necessity for so doing is obviated by means of our invention.

In Fig. 6, the curve 73 produced by the recorder 72 has been replotted as curve 74, in which temperature of the charge is measured along the vertical coordinate and the number of heating cycles during which the charge has been heated is measured along the horizontal coordinate. The curve 75 was produced by joining the points representing the time duration of each heating cycle plotted against the number of the heating cycle. The time durations were obtained from the curve of Fig. 5.

It will be seen from Fig. 5 and curve 75 of Fig. 6 that the heating cycles become progressively longer until successive cycles are approximately equal. At the same time, the curve 74 shows the charge temperature to rise steadily until it levels off at the temperature for which the regulator 14 is set to hold the furnace temperature. The charge 16 must remain in the furnace until the time represented by the upper end of the curve 74 in order that the charge will have attained the desired temperature and be uniform throughout in temperature, however, it would be futile to leave the charge in the furnace any longer. The curves 74 and 75 flatten off together and, by means of our apparatus for comparing the lengths of successive heating cycles, we are enabled to determine when the heating of the charge is completed, thus insuring complete heating but saving the expense of unnecessarily prolonged heating and likewise increasing the number of charges that may be handled in a month by the furnace 11.

In examining the curve of Fig. 5, it will be seen that successive heating cycles tend to become identical as the heating of the charge nears completion. Therefore, completion of the heating may be determined by comparing the time duration of successive complete heating cycles, successive cooling periods, or successive heating periods. In each cycle, the heating periods are shorter than the cooling periods and tend to become shorter as the difference in temperature between furnace and charge diminishes. The cooling periods tend to become longer and longer as less and less of the heat in the hottest part of the charge 16 is required to equalize the charge temperature and as the average temperature of the charge approaches more closely to the furnace temperature. During the earlier heating cycles, the regulator 14 will shut off the heat before any part of the charge has closely approached the temperature of the furnace, owing to the necessary temperature gradient between the furnace and the charge.

The relative lengths of the heating and cooling periods of the heating cycles will depend upon the relationships between the heat storage capacities of the charge and of the furnace, the rate at which heat is delivered by the heater 12, losses by radiation, convection and conduction from the furnace, the type and rate of heat transfer between the heater 12, furnace walls and the charge 16, and upon other factors. However, in a case like that shown where the cooling period is much longer than the heating period, the most accurate results will be obtained by comparing either successive complete heating cycles or successive cooling periods. We have illustrated an arrangement for comparing durations of successive cooling periods.

Referring to Fig. 2, let it be assumed that, when the furnace is started and the heater 12 is turned on, the step-by-step switch 20 is in the position with the movable timer contact 43 engaging the reversing contact 76, one of those connected to the lead 46. The winding 64 is energized simultaneously with the heater 12, and the relay 63 picks up. The contacts 66 are closed energizing the winding 49, and the armature 52 (Fig. 4) of the step-by-step switch 20 is drawn back. When the regulator 14 (Fig. 1) opens the switch 18, starting a cooling period, the relay 63 is deenergized, deenergizing the winding 49 and allowing the step-by-step switch to be advanced by its spring 53 to the position with the timer contact 43 engaging the contact 77, one of the reset contacts connected to the lead 47. A circuit is then formed from the current source terminal 54 through the movable contact 57, stationary contact 58, step-by-step switch movable contact 43, reset contact 77 of bank 41, conductor 47, contacts 36, forward winding 28, and conductor 78 back to the second current source terminal 55. The motor 23 rotates in the forward direction until the cam follower 35 drops into the notch 33 and opens the motor circuit, as shown in Fig. 7. This angular position of the motor is arbitrarily referred to as the zero position.

When the cooling period is ended, the regulator again closes the contacts 18 (Fig. 1) and the relay 63 picks up. The winding 49 is energized and draws back the armature 52 (Fig. 4) preparatory to another operation of the switch 20. The winding 60 of the relay 56 is also energized, drawing the contact 57 down against the contact 59. However, nothing further happens since the contact 44 is in a dead position 79. When the regulator thereafter opens the contacts 18, starting another cooling period, the relay 63 drops out and the step-by-step switch 20 advances as previously explained. The timer contact 43 of the relay has been advanced to engage the forward contact 80. A circuit is formed from the current source terminal 54 through the elements 57, 58, 43, 80, lead 45, and forward winding 28, through lead 78 back to the supply terminal 55. When the contacts 18 next close, ending the cooling cycle, the relay 63 picks up, energizing the relay 56 and drawing down the contact 57, and the motor 23 is deenergized and stops. Since the motor started from the zero position, the angular position in which it stops is a measure of the length of the cooling cycle.

During the subsequent cooling period, the step-by-step switch 20 will be in the position (shown) with the movable contact 43 engaging the reversing contact 81. There will be a circuit from 54 through the elements 57, 58, 43, 81, lead 46, and reversing winding 29, back through 78 to 55. The motor 23, consequently runs in a reverse direction during this cooling period. If this cooling period is not equal in duration to the previous one, the motor will stop at the end of the cooling period in a position other than the zero position and the next operation will be resetting as previously explained. However, if the heating has gone on for a sufficient length of time for a cooling period to be equal in duration to the previous one, the motor 23 will be brought back and stopped in its zero position, at which the cams are in the position shown in Fig. 7. As soon as the contacts 18 close, energizing the heater 12 and the relay 63, the relay will pick up, closing a circuit through the contact 65 to the relay winding 60, drawing down the contact 57. This will close a circuit from the current source terminal 54 through the contacts 57, 59, 44, 82, lead 48, closed contacts 38 (see Fig. 7) and the alarm 22, back to the supply terminal 55. The ringing of the alarm 22 will indicate that the cooling periods have attained equality in duration and thus the heating of the charge 16 is completed.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:

1. In combination, a furnace, a source of heat for said furnace, a temperature regulator for turning said heat source on or off when the temperature of said furnace tends to fall below or rise above a given temperature range, a relay energized when said heat source is on, a step-by-step switch having two banks of stationary contacts and movable contacts each cooperating with one of said banks of stationary contacts and advanced by deenergization of said first mentioned relay, a second relay controlled by said first relay and having double-throw contacts, a reversing motor having forward and reversing windings controlling the respective directions of rotation, a pair of cams driven by said motor, one having a notch in its periphery and the other having a projection on its periphery, a pair of switches having cam followers cooperating with said cams, one of said switches being closed and the other being open except at a predetermined angular position of said motor when the cam follower of the former switch drops into the corresponding cam notch and the cam follower of the other switch is lifted by the corresponding cam projection, an alarm, and a source of current, said alarm and said motor windings each being connected on one side to one side of said current source, the stationary contacts of one bank of said step-by-step switch being arranged in three groups with the individual contacts of one group adjacent on one side to individual contacts of a second group and adjacent on the other side to individual contacts of a third group, one group of contacts being connected to the other side of the forward winding of said motor, the second group being connected to the other side of the reversing winding, and the third group being connected to the latter side of said forward winding through said cam-notch operated switch, the contacts of the second bank of said step-by-step switch opposite the second group of said first bank being connected to the other side of said alarm through said cam-projection operated switch, the double-throw contacts of said second relay being arranged to connect the other side of said current source to the moving contact cooperating with the first bank of step-by-step stationary contacts when said first relay is not energized and to the other moving contact of said step-by-step switch when the first relay is energized.

2. In combination, a furnace, a source of heat for said furnace, a temperature regulator for turning said heat source on or off when the temperature of said furnace tends to fall below or rise above a given temperature range, a step-by-step switch having first and second banks of stationary contacts and first and second movable contacts cooperating with the respective banks of stationary contacts and advanced by the turning off of said heat source, a reversing motor having forward and reversing windings controlling the respective directions of rotation of said motor, cam means driven by said motor having a notch and a projection, a normally closed switch having a cam follower adapted to drop into said notch and open said switch at a predetermined angular position of said motor, a normally open switch having a cam follower adapted to be lifted by said cam projection to close said latter switch at a predetermined angular position of said motor, an alarm, a source of current having two terminals, and means for connecting one terminal of said current source to the second of said step-by-step moving contacts when said heat source is on and to the first of said contacts when said heat source is off, said motor windings being connected on one side to the second of said terminals, the stationary contacts of the first bank of said step-by-step switch being arranged in three groups with the individual contacts of one group adjacent on one side to individual contacts of a second group and adjacent on the other side to individual contacts of a third group, one group of contacts being connected to the other side of the forward winding of said motor, the second group being connected to the other side of the reversing winding of said motor, and the third group being connected to the latter side of said forward winding through said normally closed switch, said alarm being connected through said normally open switch between said second terminal of said current source and the contacts of the second bank of said step-by-step switch opposite the contacts of the second group of said first bank.

3. In combination, a furnace, a source of heat for said furnace, a temperature regulator for turning said heat source on or off when the temperature of said furnace tends to fall below or rise above a given temperature range, a step-by-step switch having first, second, and third stationary contacts, having a movable contact adapted to engage said stationary contacts in rotation as successive steps, having a fourth stationary contact and a second movable contact adapted to engage said fourth stationary contact when said first movable contact engages said second stationary contact, and having means for advancing said movable contacts a step whenever said heat source is turned off, a reversing motor having forward and reversing windings controlling the respective directions of rotation of said motor, cam means driven by said motor, a normally closed switch and a normally open switch controlled by said cam means to open and close respectively at a predetermined angular position of said motor, an alarm, a source of current having two terminals, and means for connecting one terminal of said current source to the second of said step-by-step switch movable contacts when said heat source is on and to the first of said movable contacts when said heat source is off, said motor windings being connected on one side to the second of the terminals of said current source, the first of said step-by-step switch stationary contacts being connected to the other side of the forward winding of said motor, the second stationary contact being connected to the other side of the reversing winding of said motor, and the third stationary contact being connected to the latter side of said forward winding through said normally closed switch, said alarm being connected through said normally open switch between said second terminal of said current source and the fourth stationary contact of said step-by-step switch.

4. In combination, a furnace, a source of heat for said furnace, a temperature regulator for turning said heat source on or off when the temperature of said furnace tends to fall below or rise above a given temperature range, a step-by-step switch, a reversible timer, an alarm, a source of current, and a double-throw switch, said step-by-step switch having first and second relatively movable members and means controlled by said temperature regulator for advancing one relatively movable member a step at a time with respect to the other, the first member of said switch having forward, reverse, reset, and alarm contacts, and the second member having timer and alarm contacts, said timer contacts being adapted to engage said forward, reverse, and reset contacts in rotation as successive steps and the alarm contacts of both members being adapted to engage each other when the reverse contact engages the timer contact, said timer having forward and reverse windings for operating it in its respective directions, reset contacts open at a zero position of the timer but otherwise closed, and alarm contacts closed at a zero position of the timer but otherwise open, said source of current having first and second terminals, said double-throw switch having means controlled by said regulator for connecting the first terminal of said current source to the timer contact of said step-by-step switch when said heat source is turned off and to the alarm contact of the second member of said step-by-step switch when said heat source is turned on, the forward winding of said timer being connected between the forward contact of said step-by-step switch and the second terminal of said current source, the reversing winding of said timer being connected between the reversing contact of said step-by-step switch and said second terminal of said current source, and said forward winding also being connected in series with the reset contacts of said timer between the reset contact of said step-by-step switch and the second terminal of said current source, and said alarm being connected in series with the alarm contacts of said timer between the alarm contact of the first member of said switch and the second terminal of said current source.

5. In combination, a furnace, a source of heat for said furnace, a temperature regulator for turning said heat source on or off when the temperature of said furnace tends to fall below or rise above a given temperature range, a reversible timer having forward and reversing windings, an alarm, a source of current, and switching means controlled by said temperature regulator having forward, reverse, reset, and alarm contacts adapted to be closed in succession through repeated cycles, said forward contacts and said reset contacts being adapted to close circuits from said current source through said forward winding, said reversing contacts being adpated to close a circuit through said reversing winding, said alarm contacts being adapted to close a circuit through said alarm, said timer including means for interrupting the circuit of said reset contacts when said timer is in its zero position and including means for interrupting the circuit of said alarm contact except when said timer is in its zero position.

6. In combination, a furnace, a source of heat for said furnace, a temperature regulator for turning said heat source on or off when the temperature of said furnace tends to fall below or rise above a given temperature range, timing and alarm means with forward, reverse, reset, and alarm circuits, a source of current, means controlled by said regulator for connecting said source to said circuits in succession in repeated cycles, means for interrupting said alarm circuit except when said forward and reverse circuits have previously been closed for equal lengths of time, and means for interrupting said reset circuit, as soon as it has been closed during a cycle, for a length of time equal to the difference in the lengths of time the forward and reverse circuits have previously been closed.

7. In combination, a furnace, a source of heat for said furnace, a temperature regulator for turning said heat source on or off when the temperature of said furnace tends to fall below or rise above a given temperature range thus producing successive heating cycles, an alarm, and means for operating said alarm whenever successive heating cycles are equal in time duration.

8. In combination, a furnace, a source of heat for said furnace, a temperature regulator for turning said heat source on or off when the temperature of said furnace tends to fall below or rise above a given temperature range thus producing alternate heating and cooling periods, an alarm, and means for operating said alarm when successive cooling periods are equal in time duration.

9. Apparatus for comparing time durations of successive intermittently occurring operations, said apparatus comprising timing and alarm means with forward, reverse, reset, and alarm circuits, a source of current, means for connecting said source to said circuits in succession in repeated cycles, means for interrupting said alarm circuit except when said forward and reverse circuits have previously been closed for equal lengths of time, and means for interrupting said reset circuit as soon as it has been closed during an operation for a length of time equal to the difference in the lengths of time the forward and reverse circuits have previously been closed.

EDWARD J. FLYNN.
JOSE T. MIRELES MALPICA.